Sept. 6, 1932.  R. L. MORSE  1,875,389
MAP
Filed July 31, 1930
Fig. 1.
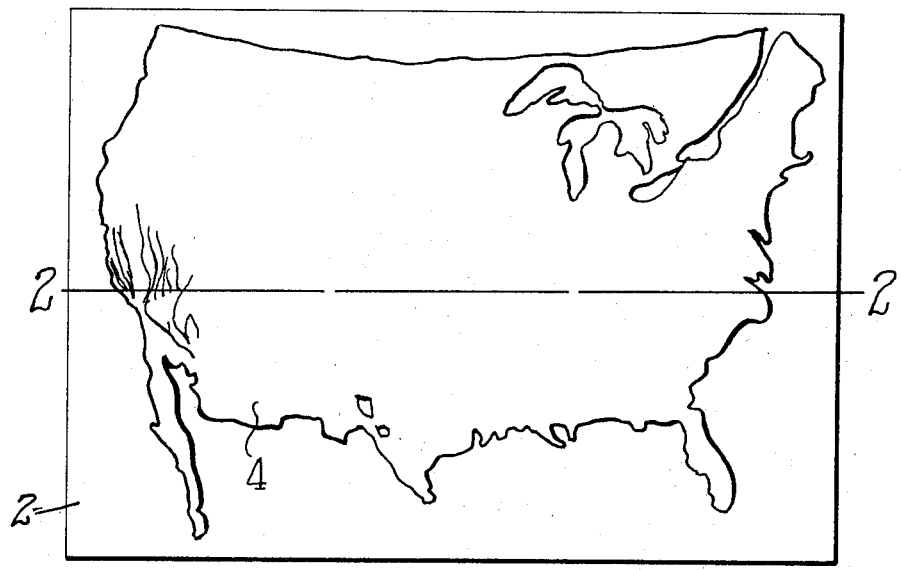
Fig. 2.
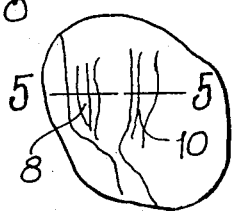
Fig. 4.
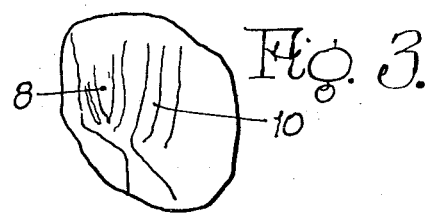
Fig. 3.
Fig. 5.
INVENTOR.
Ralph L. Morse.
BY
ATTORNEY.

Patented Sept. 6, 1932

1,875,389

UNITED STATES PATENT OFFICE

RALPH L. MORSE, OF SPRINGFIELD, MASSACHUSETTS

MAP

Application filed July 31, 1930. Serial No. 471,979.

This invention relates to educational apparatus and is directed more particularly to improvements in the method of producing educational maps and the product thereof.

According to the principal objects of this invention a map is provided which is curved to represent the curvature of the earth or the curvature of that part of the earth's surface which is represented by the map and certain portions of the map are elevated so as to graphically represent the relative elevations of different portions of the earth's surfaces. By means of the invention one is able from a study of the map to vizualize the true appearance of that portion of the earth's surface which is represented by the map, that is, the curvature of the earth's surface and the contour thereof which is represented by the map are graphically illustrated, all to the end that a more thorough understanding of geography is facilitated.

The novel features of the invention are accomplished by providing a curved support to which is secured a map having portions thereof which are in relief. In order to provide geographical designations for the map in their proper relative positions, when the map is formed to have the relief portions, the map as a first step is printed with the geographical designations in inaccurate geographical relation. Then by forming these relief portions in the map the geographical designations are brought to their proper relative position.

The preferred form of the invention will now be described with particular reference to the drawing, wherein:

Fig. 1 is a plan view of a map showing the novel features of the invention.

Fig. 2 is a sectional view on the line 2—2 of Fig. 1 with a portion of the map omitted.

Fig. 3 is a fragmentary plan view of a map which has been printed and before it has been subjected to the relief-forming step.

Fig. 4 is a similar plan view showing the map as it appears after the parts thereof are relieved, and Fig. 5 is a sectional view on the line 5—5 of Fig. 4.

Referring now to the drawing in detail the invention will be more fully described.

As shown in Fig. 1 there is provided a support 2 which has a curved map-supporting surface 3. Preferably according to the invention the curvature of this surface will be such as to represent the actual curvature of that part of the earth's surface which is represented by the map. The support may be made from any suitable material and may of course consist of any relatively rigid sheet material such as cardboard or the like.

A map 4 according to the method of the invention is first printed or lithographed to have the necessary geographical designations which will represent mountains, rivers, cities, lakes and the like. Since portions of the map are to be elevated, the geographical designations are, when the map is printed, arranged in inaccurate geographical relation. The reason for this will be readily appreciated when it is explained that the final map has portions in relief formed by pressing or molding the map to provide relatively high and low places. With the map printed so that the designations are in the necessary inaccurate relation, the map is then pressed or offset so as to provide the necessary elevated portion or portions in relief with the designations then in a proper geographical relation with respect to the horizontal plane of the map. For instance, as in Fig. 3, the portion of the map represented has two mountains 8 and 10, designated thereon in inaccurate geographical relation, so that when the mountains are elevated above the plane of the paper or are made to appear in relief they will then be in their correct relative position with reference to the horizontal plane of the map as represented in Figs. 4 and 5. When the printed map is thus made to have the relief portions, the geographical indications are brought into proper relative positions whereby the completed final map has portions elevated above other portions to explain the relative elevations of the different portions.

The forming of the map in order to provide the relief portions may be accomplished by the means of dies suitably arranged to distort the map. The map of course may be printed on any suitable material, such as paper or other more or less inelastic material, which may be moulded more or less to the form shown in Fig. 5 and when so formed the map will actually have these portions which project above the plane of the map. With the map thus provided with the geographical indications in inaccurate relation and which is then formed or pressed to provide the portions in relief, the map is secured to the curved surface of the support as is shown in Fig. 1.

From the foregoing it will be readily appreciated that by curving the support in a certain way it is possible to provide a map which actually represents the curvature of that portion of the earth which is represented by the map, and by thus elevating portions of the map the relative elevation of the earth's surface will be graphically represented. In this way the map as finally produced will show the actual appearance of the earth's surface. This is to be distinguished from the ordinary flat map which in reality is a distorted representation of the true conditions, while in this case the true physical conditions of the earth's surface are illustrated by the curvature and portions in relief.

Having described the invention in the form at present preferred, what I now desire to claim and secure by Letters Patent of the United States is:

The method of producing an educational map which consists in, printing on a flat sheet of relatively inelastic material a map with geographical designations located thereon in inaccurate geographical relationship, shaping said sheet by offsetting the same to provide relief portions thereon and bring said geographical designations into permanent, correct geographical relationship, and finally in securing said shaped sheet to a relatively smooth surface of a rigid sheet of material which is curved to represent the curvature of the earth's surface, all co-operating to provide a final relief map with geographical designations thereon in permanent and proper relief relative to one another and which is curved to represent the curvature of that portion of the earth's surface represented by the map.

In testimony whereof I affix my signature.

RALPH L. MORSE.